United States Patent
Messano et al.

(10) Patent No.: US 7,366,472 B2
(45) Date of Patent: Apr. 29, 2008

(54) TECHNOLOGY FOR CREATING A RF RADIATION-FREE ENVIRONMENT

(76) Inventors: Al Messano, 23 Downing Pl., Harrington Park, NJ (US) 07640; Alan Ross, 15 Seventeenth St., Norwood, NJ (US) 06748

( * ) Notice: Subject to any disclaimer, the term of this patent is extended or adjusted under 35 U.S.C. 154(b) by 728 days.

(21) Appl. No.: 10/846,975

(22) Filed: May 14, 2004

(65) Prior Publication Data
US 2004/0235422 A1 Nov. 25, 2004

Related U.S. Application Data

(63) Continuation-in-part of application No. 09/706,699, filed on Nov. 7, 2000, now Pat. No. 6,785,512.

(51) Int. Cl.
*H04B 1/00* (2006.01)
*H04B 15/00* (2006.01)

(52) U.S. Cl. .............. 455/63.1; 455/106; 455/300; 455/301; 174/377; 174/395; 428/297.4; 428/298.7; 428/299.4; 442/59; 442/117

(58) Field of Classification Search .......... 455/63.1–2, 455/300–301, 106; 428/688, 297.1, 4, 7, 428/298.1, 299.1; 174/35 R, 35 MS, 35 TS, 174/377–397; 442/59, 117, 120, 152, 131–133
See application file for complete search history.

(56) References Cited

U.S. PATENT DOCUMENTS

| | | | | |
|---|---|---|---|---|
| 4,772,760 A | * | 9/1988 | Graham ...................... | 174/389 |
| 4,822,966 A | * | 4/1989 | Matsubara .................. | 219/730 |
| 4,845,310 A | * | 7/1989 | Postupack ................... | 174/389 |
| 4,941,207 A | * | 7/1990 | Maeda et al. ............... | 398/119 |
| 5,124,889 A | * | 6/1992 | Humbert et al. ............ | 361/818 |
| 5,235,492 A | * | 8/1993 | Humbert et al. ............ | 361/818 |
| 5,271,056 A | * | 12/1993 | Pesola et al. ............ | 455/575.1 |
| 5,401,562 A | * | 3/1995 | Akao ....................... | 428/211.1 |
| 5,668,070 A | * | 9/1997 | Hong et al. ................. | 501/126 |
| 5,770,534 A | * | 6/1998 | Hong ............................ | 501/1 |
| 5,855,988 A | * | 1/1999 | Matsuo .................... | 428/195.1 |
| 5,885,911 A | * | 3/1999 | Ashcraft et al. ............ | 442/117 |
| 5,889,230 A | * | 3/1999 | Katz .......................... | 174/377 |
| 5,916,486 A | * | 6/1999 | Angelopoulos et al. ..... | 252/512 |
| 5,938,979 A | * | 8/1999 | Kambe et al. .............. | 252/500 |
| 5,968,854 A | * | 10/1999 | Akopian et al. ............ | 442/132 |

(Continued)

FOREIGN PATENT DOCUMENTS

JP 2000022382 1/2000

*Primary Examiner*—Tuan A. Tran
(74) *Attorney, Agent, or Firm*—Winston & Strawn LLP

(57) ABSTRACT

The invention relates to a method of rendering telecommunication devices ineffective, by creating a substantially radio frequency radiation-free environment by providing an interference generating pattern (IGP) adjacent to the environment in a position between the environment and a source of radio frequency radiation signals so as to substantially reduce, or interfere with such signals thus preventing typical operation of the wireless telecommunications devices. The IGP is generally one that is non-conductive and is or includes a diffraction grating. The IGP is positioned adjacent the environment between the environment and a source of radio frequency radiation signals. Preferably, the IGP is provided as a support member configured in the shape of a diffraction grating, and includes a paint or coating of a non-conductive material having a high dielectric constant thereon.

21 Claims, 9 Drawing Sheets

U.S. PATENT DOCUMENTS 5,976,666 A * 11/1999 Narang et al. .............. 428/138
6,030,708 A * 2/2000 Ishibashi et al. ............ 428/441
6,043,769 A * 3/2000 Rowe et al. ................... 342/4
6,197,408 B1 * 3/2001 Kanbara et al. ............ 428/209

* cited by examiner

800 MHz IGP

2400 MHz IGP

US 7,366,472 B2

TECHNOLOGY FOR CREATING A RF RADIATION-FREE ENVIRONMENT

CROSS-REFERENCE TO RELATED APPLICATIONS

This application is a continuation-in-part of non-provisional application Ser. No. 09/706,699 filed Nov. 7, 2000, now U.S. Pat. No. 6,785,512 the entire content of which is expressly incorporated herein by reference thereto.

TECHNICAL FIELD

This invention relates to improvements in the technology for creating Radio Frequency (RF) radiation-free enclosures of various sizes, which will reduce the signal strength of RF radiation therein. The net result will be a signal strength reduction in order to create an RF-free environment as to render wireless communications devices ineffective therein.

BACKGROUND OF THE INVENTION

Wireless communications devices such as cell phones and pagers have become essential to everyday life. While wireless communications devices are of great benefit, they also have become an intrusion of privacy and an annoyance. For example, when attending the theater, patrons do not wish to have the performance interrupted by a ringing cell phone or pager. In certain situations, RF radiation may also interfere with commercial or industrial processes such as testing, medical diagnostics, or general telecommunications. For these reasons alone, the desirability of an RF radiation-free enclosure is evident.

Although preliminary results are inconclusive, ongoing research suggests that active wireless telecommunications devices such as cell phones operating at various frequencies, PDA's, laptop computers with wireless access, satellite phones, pagers and other wireless devices pose a health risk to the consumer. Furthermore, new utilization of the Electromagnetic (EM) spectrum (See FIG. 1, Wireless Communications Devices) is proposed. While increasing the ubiquity of wireless applications, such utilization may increase the general risk of RF radiation, loss of privacy and the compromising of security.

SUMMARY OF THE INVENTION

The invention relates to a method of rendering telecommunication devices ineffective, which comprises creating a substantially radio frequency radiation-free environment by providing an interference generating pattern (IGP) adjacent to the environment in a position between the environment and a source of radio frequency radiation signals so as to substantially reduce, or interfere with such signals thus preventing typical operation of the wireless telecommunications devices.

The IGP is generally one that is non-conductive and is or includes a diffraction grating. The IGP is positioned adjacent the environment between the environment and a source of radio frequency radiation signals. Preferably, the IGP is provided as a support member configured in the shape of a diffraction grating, and includes a paint or coating of a non-conductive material having a high dielectric constant thereon. The dielectric materials include families of materials of high dielectric constant, K, ranging from values of K=6 to 100, and including compounds of silicon and of carbon, refractory materials, rare earth materials, or semiconductor materials. The paint or coating is applied at a generally uniform thickness upon the diffraction grating configured support member.

The environment is typically an enclosure having one or more walls and the IGP is provided on at least one wall. When the enclosure includes a ceiling and floor, the IGP may be provided upon at least either the ceiling or floor. Generally, the IGP may be provided as a paint or coating on an organic or inorganic building material The invention also relates to a substantially radio frequency radiation-free environment that includes an IGP as disclosed herein adjacent thereto in a position between the environment and a source of radio frequency radiation signals so as to substantially reduce or interfere with such signals to prevent typical operation of telecommunication devices therein.

When the enclosure is a building that includes exterior windows and doors, the IGP may be provided adjacent to or upon at least one of the windows or doors. To do so, the support member of the IGP may be provided upon a cloth, fabric or other such material that is located adjacent the windows or doors of the enclosure. In other embodiments of the invention, the environment may be a container or box, either fixed, portable or mobile, having a top, bottom and sides each provided with the IGP.

The IGP described herein is advantageously configured to attenuate radio frequency radiation in the range of 800 to 38,000 MHZ. Advantageously, interference generating pattern reduces the radio frequency signal by at least 20 dB.

The method can include superimposing a plurality of support members to provide IGPs that attenuate the entire range of radio frequency radiation. Alternatively, the support member can be comprised of different IGPs so as to substantially attenuate the entire range of radio frequency radiation. The support member can be provided in the form of a grating, cone, sphere or polygon. Also, the IGP may be comprised of different patterns constructed with different physical dimensions for each pattern. For example, the IGP may be comprised of vertical layering of the different multiple patterns, or of horizontal layering of the different multiple patterns. Also, the IGP may be comprised of vertical or horizontal layering of the different multiple patterns which are axially offset from each other.

The invention also relates to the substantially radio frequency radiation-free environments and materials provided by the method.

BRIEF DESCRIPTION OF THE DRAWINGS

Preferred embodiments of the invention are disclosed in the following drawing figures, wherein.

DETAILED DESCRIPTION OF THE PREFERRED EMBODIMENTS

The purpose of this invention is to create an RF-free environment. This RF-free environment has direct application to public, private, military, government and personal space, and is provided by an enclosure having certain materials that absorb, reflect, refract or interfere with the propagation of RF waves. In this regard, this invention is totally passive. It does not transmit any EM signal at all. This means it does not have any RF-related health effects whatsoever and does not interfere with owners and operators of wireless equipment, services or systems. Furthermore, there is no need for it to be part of a grounding system which must typically be built for wireless systems.

This invention utilizes materials that are:
Nonconductive
Environmentally safe
Non-carcinogenic
Chemically inert, non-toxic, non-combustible and non-corrosive
Naturally occurring or man-made
Organically or inorganically based
Not part of a telecommunications grounding or bonding system
Readily available, economically inexpensive, and easy to apply As a result, this invention will have a beneficial impact on public safety and health while eliminating the nuisance effects of commercial wireless devices and generally increasing security. The enclosure which creates this RF-free environment has a myriad of other applications such as in testing of equipment, medical non-invasive scanning, etc.

Figure 1:
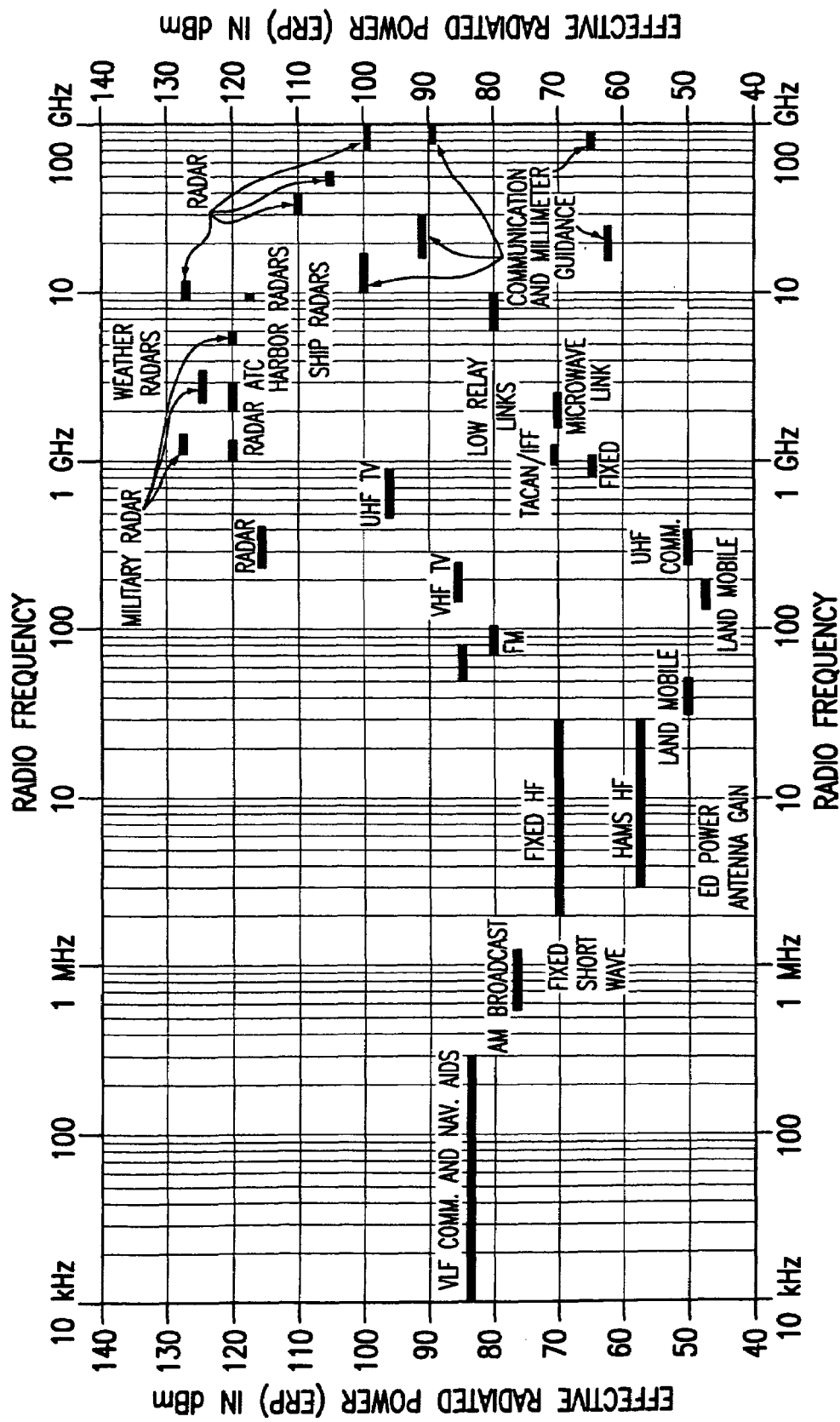
FIG. 1 is a schematic diagram of the RF portion of the electromagnetic spectrum.

The EM spectrum ranges from very low frequencies, such as 60 cycles per second (called Hertz, abbreviated Hz) of power lines to very high frequencies, such as 40 billion cycles per second (called Gigahertz, abbreviated GHz) of microwave communications systems. The frequencies of lasers and optical devices are almost a million times greater in frequency. The Electromagnetic spectrum is shown in FIG. 1.

The invention directly targets part of the so-called Radio Frequency (RF) portion of the Electromagnetic spectrum utilized by commercial wireless carriers. This RF spectrum ranges roughly from 800 MHz to 2400 MHZ. However, the technology can also be extended from 2400 MHZ to 38 GHz so that the invention has direct application to other portions of the EM spectrum as well.

Figure 2B:
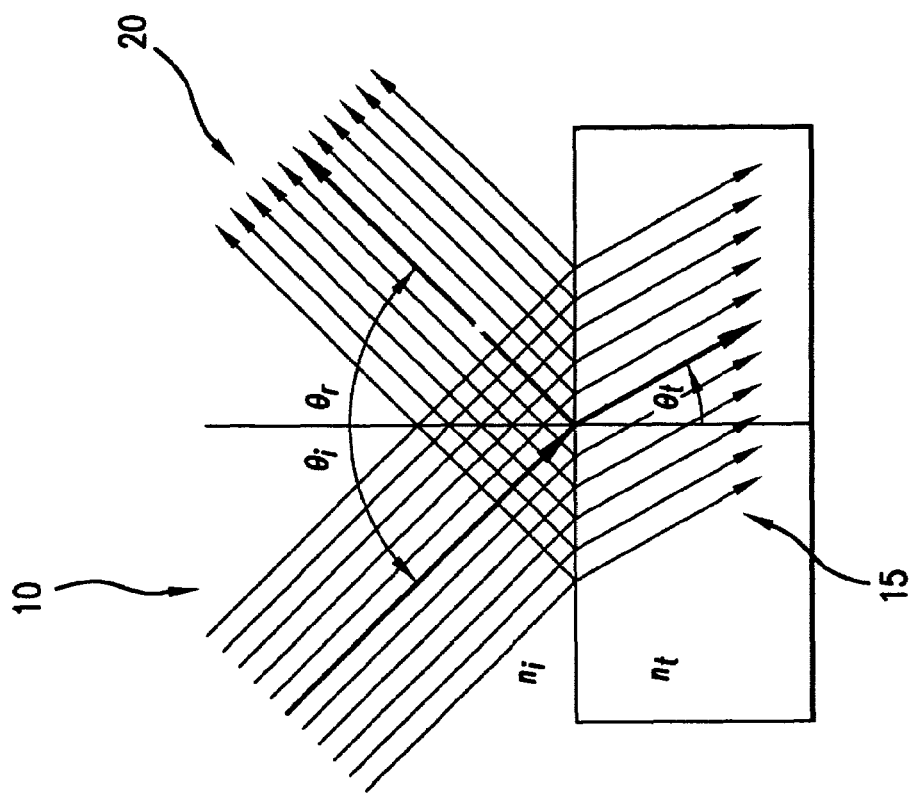
FIGS. 2A and 2B are schematic representations of the effects on waves when a solid is encountered.
Figure 2A:
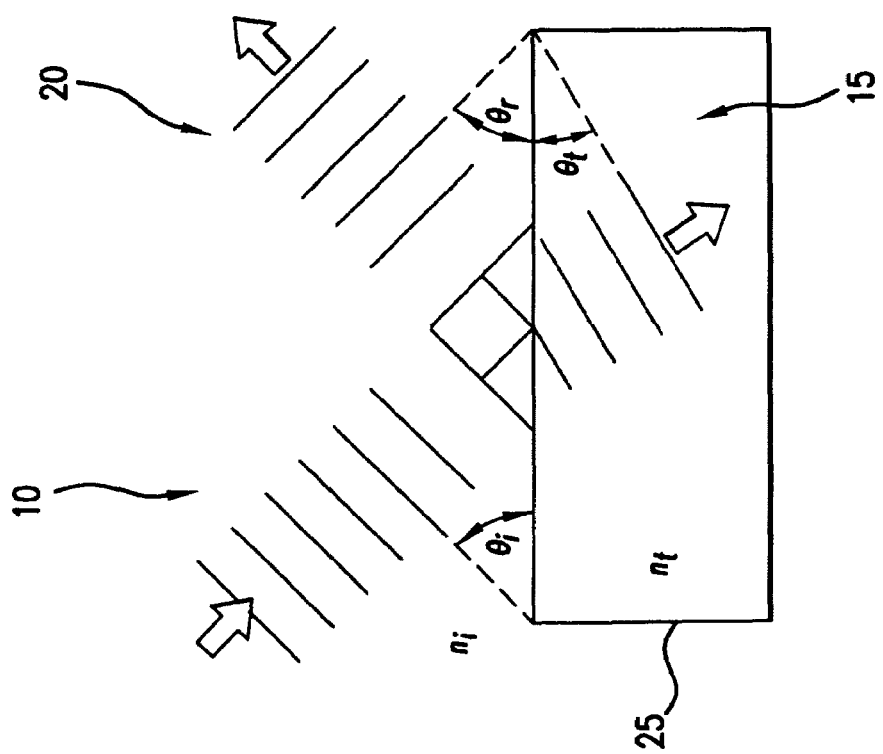

In order to reduce EM radiation and create an EM radiation-free environment, the invention utilizes the principles of wave effects on the surface of a solid. FIG. 2A illustrates these wave effects when an incident wave 10 is directed at angle $*_i$ against the surface of a solid 25. Part of the wave, called a transmitted wave 15, passes into the solid while another part of the wave 20 is reflected from the surface of the solid, at angle $*_r$. As shown in FIG. 2B, the transmitted wave 15 is also called a refracted wave. By reflecting a greater portion of an EM wave, a much smaller portion is transmitted or refracted. With a sufficient reduction of the wave strength signal, as explained below, telecommunication devices that are placed or located within the environment become inoperative.

A basic principal of physics reveals the relationship between the frequency and the wavelength of an EM wave:

$$C = \text{Wavelength} \times \text{Frequency}$$

where $C$=the speed of light

Figure 3A:
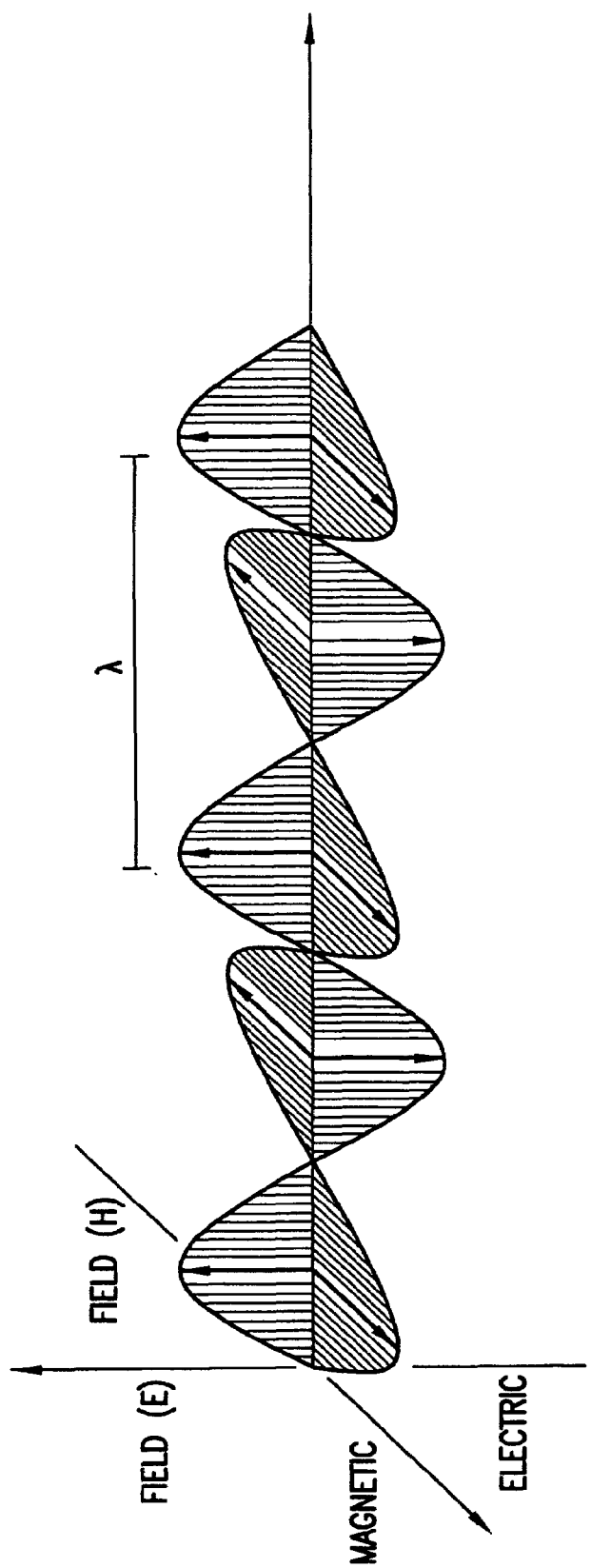
FIGS. 3A and 3B are graphical and schematic illustrations of the relationship between wavelength and frequency.
Figure 3B:
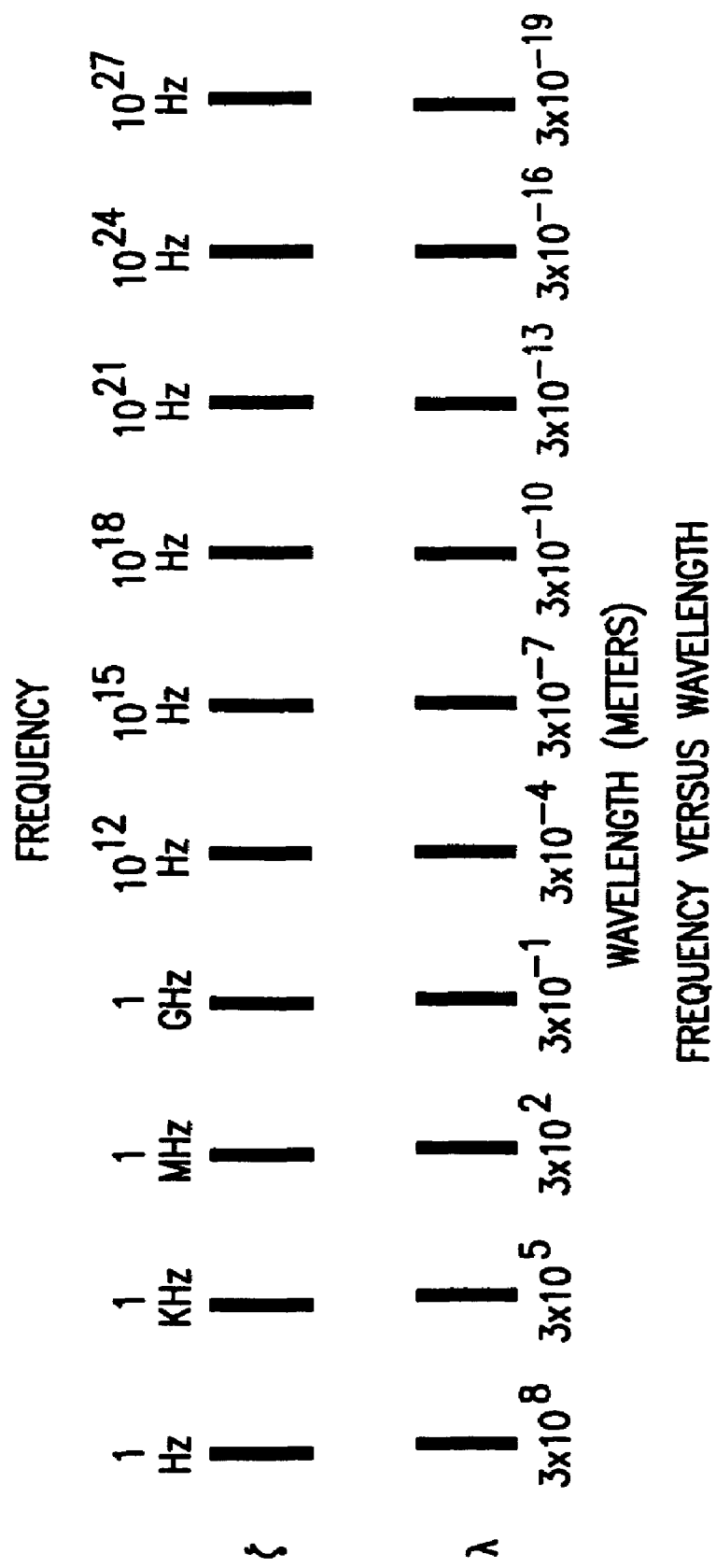

This calculation indicates that the wavelength of an 800 MHZ EM wave is 14.76 inches (375 mm) and the wavelength of a 2400 MHZ EM wave is 4.92 inches (125 mm). FIG. 3A shows the relationship between electric and magnetic fields in a wave along with the definition of wavelength, while FIG. 3B shown the relationship between some selected frequencies and their respective wavelengths according to the above equation.

This invention preferably uses the application of materials in the family of silicon carbide or (SiC), a common inorganic material, to the enclosure to reduce, or attenuate, RF signal strength by absorption, reflection, refraction and interference generation. Dielectrics from other families of materials as well. For example, refractory materials, rare earth materials, or semiconductor materials may be used. All that is required is that the materials have high dielectric constants and be cost-effective for the specific use. Preferably, the dielectric constant is between the range of 6 to 100 although there is no upper limit such that materials of dielectric constants greater than 100 could be of specific use with this invention.

The materials to be used are in the family of carbon-based silicates. The most preferred material, SiC, is readily available. It has been found in outer space as intergalactic dust grains. This dust ranges in size from 0.01 microns (micrometers or one-millionth of a meter) to 10 microns. These grains have been proven to have an effect on signals with frequencies (or, conversely, wavelengths) in certain portions of the EM spectrum (See FIG. 4, Wavelength vs. Frequency).

Calculations indicate that, depending on the thickness of the material used, SiC could generate significant reduction in signal strength, called attenuation, as well as significant reflection and reflection effects (called phase changes) for the portions of the RF spectrum under consideration. These material effects coupled with proper IGP design could provide a signal strength reduction of 10 to 50 decibels (dB), with higher reductions being more effective. A 50 dB reduction would lower the signal strength to a level of one hundred thousandth of its original value, thus effectively eliminating the signal. A reduction of at least 20 dB is desired in order to create a substantially RF radiation-free environment.

In free space, the size of the grain and the structures constructed with such grains determines what portion of the EM spectrum is affected. Since wavelength is inversely proportional to frequency, lower parts of the EM frequency spectrum would be affected by a larger grain size, such as about 5 to 25 microns. Larger grain size (on the order of 10 microns) would preferably be utilized depending on the design frequency. Since the RF portion of the EM spectrum is of a relatively lower frequency (800 MHZ to 2400 MHz), this larger grain size is used. On a larger scale, these materials would be utilized to create physical structures or patterns which will more closely approximate the wavelength of RF spectrum under consideration.

Specifically, the materials are applied in a manner as to create a diffraction grating pattern, called the IGP, that is comparable with the wavelengths of the RF spectrum under consideration. The grating angle, also called blaze angle, can be 45 degrees so that the grating spacing will be equal to the wavelength of the RF frequency in question. A grating closure angle of either 45 degrees or 90 degrees results in an easier application process. The grating was to be constructed with either a triangular or a sawtooth diffraction pattern, which offer more reflective surfaces to the incident wave.

In contrast, the prior art provides electrical shielding based on the principles of a Faraday cage. This cage intercepts radio frequency waves in a manner similar to that of an antenna and guides the signal away over a conductive network made of conductive metal wire or foil. The cage must be made of metal or otherwise be conductive so that the incoming waves can be dissipated and grounded. The scientific principle behind the Faraday cage is that the electric charge on a conductor resides only on its exterior and had no influence on anything enclosed within it. A Faraday cage may be constructed as an enclosure of either solid or meshed electrically conductive material. Such cages are typically constructed of good conductor materials such as copper or aluminum.

Because of these properties, the Faraday cage has been used in a variety of ways in the years since its inception. For example, they have been utilized as "screen rooms" in scientific experiments. However, the shielding effect of the Faraday cage is used most often to eliminate electromagnetic fields within a volume to protect electronic equipment and systems from lightening strikes, electrostatic discharges and interference from noise emanating from various parts of the electromagnetic spectrum. Manufacturers of such cages provide calculations revealing the protection capabilities for electromagnetic fields of different frequencies. These cages are used a bit differently in the telecommunications industry. From its earliest origins, the telegraph and then telephone companies relied on grounding techniques to make their technologies work. As these industries evolved, grounding standards for both central office and outside plant infrastructure were developed, implemented and improved.

The first wireless technologies used by the telecom industry were long-haul microwave (high frequency radio) transmission systems. These microwave facilities utilized antennas and tall towers, likely candidates for lightening strikes. They also contained sensitive and sophisticated electronic equipment, prone to disruption from surges often produced by such a strike. So some of the first applications for Faraday cages in the wireless industry were for lightening protection.

Bell System Standards (BSP's) dating back to 1978 depicts a "Typical Ring Ground" installation the interior of a microwave equipment station. This installation relied upon both an internal ground ring (a wide meshed Faraday cage) and an external ground ring. All equipment inside and outside the station were tied together to the ground rings which in turn was bonded electrically to any tower on the premises. The tower was then adequately grounded to the earth. As new wireless technologies evolved, the need arose to extend these standards to wireless transmission sites or "cell sites."

Faraday cages, in general, have problems in that, in order for any structure of conducting material to work properly, it must be grounded to the earth. If properly grounded, the structure will be capable of channeling away any charge imposed on it from the exterior. This is precisely why telecommunications industry standards require elaborate grounding procedures and the routine testing of grounding systems. If a structure is not grounded properly, any external energy impinging the structure will seek whatever path it can find in order to reach the common earth ground. This path may be through valuable and sensitive equipment inside the structure. And in even worse cases, it may be through a person in contact with some conductive material inside the structure. Also, the cost of creating such cages are high, either due to the materials used, the labor to install them, or both. This is probably the reason why such cages are used only in specialized or critical environments rather than in a more common fashion.

In contrast, the present invention operates by interfering with the electromagnetic properties of incoming radio signal. First of all, an incoming radio signal impinges on a coating of dielectric material in an IGP pattern that is or includes a diffraction grating. The pattern can be provided by preparing a series of lines or shapes of the sawteeth, preferably as a shape or block of non-conductive, inorganic material. It also can be provided by making the pattern of another non-conductive material, and then applying the inorganic material upon the pattern as a coating. In either case, the diffraction grating of the IGP acts as a mirror to reflect a certain portion of the radio signal and decreases its strength. The remaining radio signal then impinges upon the IGP, which creates interference that reduces the strength of the wave. This IGP is used to essentially create a box through which radio signals can pass only at very much reduced strength if at all. This reduction of radio signal strength makes radio communications ineffective.

The present invention has absolutely no reliance on the electrical properties of the incoming radio waves, only upon the electromagnetic, or wave, properties of the incoming radio signal. Thus, dielectric materials, which are good insulators but very poor conductors, are utilized to form a non-conductive IGP that blocks the strength or transmission of the radio frequency radiation signals by attenuation of signal wavelength. This construction provides two different and unexpected advantages over Faraday cages: first, the entire system is non-conductive, and second, it does not rely upon electrical characteristics to prevent or reduce signal transmission. The latter point is of great importance since it avoids all the problems of an electrically conductive Faraday cage. In addition, the costs for the materials and their installation are significantly lower than for preparing conductive cages. Thus, the present invention provides more simplicity and reasonable costs so that the system can be more readily implemented.

Figure 4:
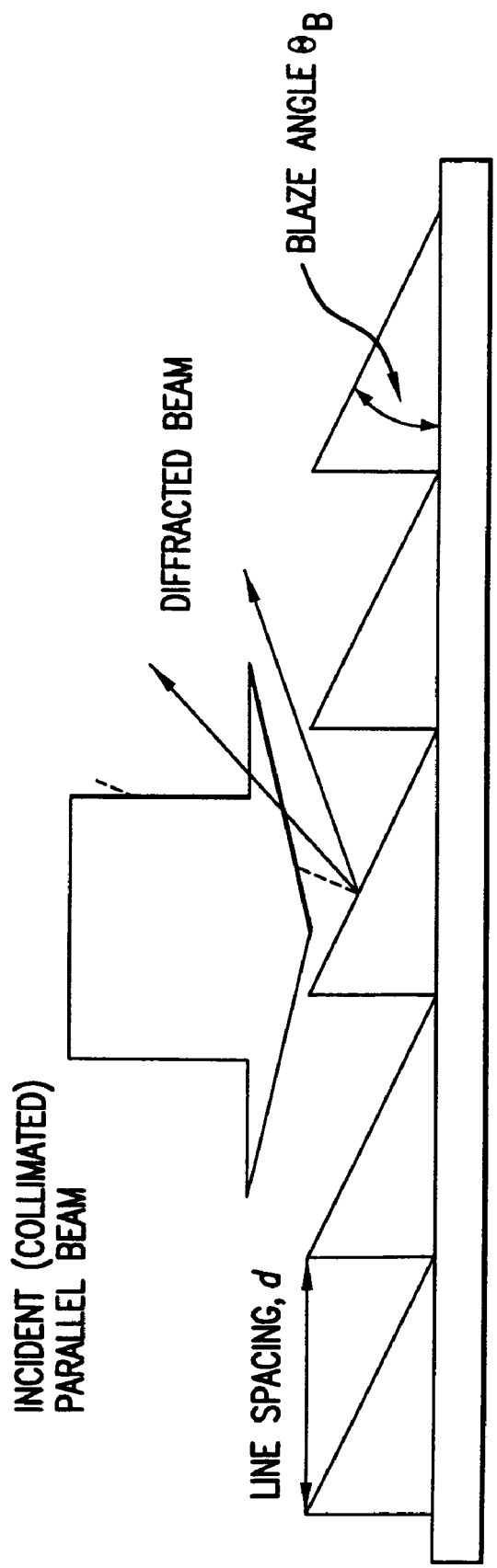
FIG. 4 is an illustration of a diffraction grating.

FIG. 4 illustrates the operation of a diffraction grating. A plurality of saw-tooth gratings, spaced at a distance d and having blaze angle $*_1$ are provided on the surface. An incident or collimated parallel beam directed at the grating is diffracted away from, rather than through, the surface.

Figure 5A:
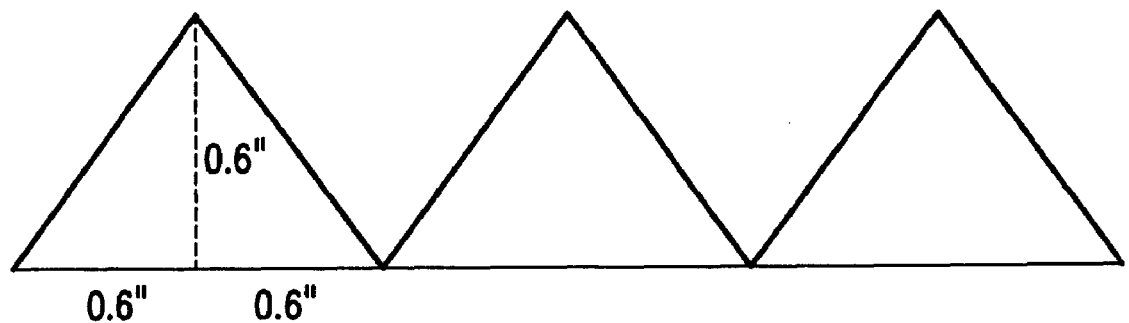
FIGS. 5A and 5B illustrate two IGPs for different EM frequencies.

The diffraction grating can be applied in a periodic pattern. The periodicity of the pattern will be determined by the frequency and, therefore the wavelength of the RF frequencies under consideration. The period may be based on either the full wavelength or the quarter-wavelength of the frequency under consideration to create the IGP. The net result is to create a series of "double slits" to act as additional interference generators. Since the range of commercial wireless communications is considered to be between 800 MHZ and 2400 MHZ, the highest frequency is three times the lowest frequency. Therefore, in this example, the grating pattern will repeat every fractional wavelength, such as every three (3) quarter-wavelengths of the higher frequency. As shown in FIG. 5A, the calculated geometry for a triangular pattern is such that the repeating triangle is approximately 1.23 inches long and 0.61 inches high for 2400 MHZ frequencies and 3.69 inches long and 1.2 inches high for 800

MHZ. A three-to-one ratio is observed. Quarter-wave patterns will yield smaller IGP structures (by a factor of one-half to one-fourth, respectively) than will half-wave or full-wave patterns.

The grating is applied in a periodic pattern. The periodicity of the pattern was to be determined by the frequency and, therefore the wavelength of the RF frequencies under consideration. The period may be based on either the full wavelength or the quarter-wavelength of the frequency under consideration to create an interference pattern. The net result is to create a series of "double slits" to act as additional interference generators. Since the range of commercial wireless communications is considered to be between 800 MHZ and 2400 MHZ, the highest frequency is three times the lowest frequency. Therefore, in this example, the grating pattern will repeat every three quarter-wavelengths of the lower frequency.

The larger 800 MHZ patterns may be approximated by repeating groups of three (3) 2400 MHZ patterns. Each 800 MHZ pattern will be a triangle approximately 1.23 inches long and no taller than 0.61 inches. Depending on the application method, there may be a 3.69 inch long "slit", with no imbedded IGP, between the groupings of three (3) 800 MHZ patterns. This slit will be another interference (via diffraction) source.

Figure 5B:
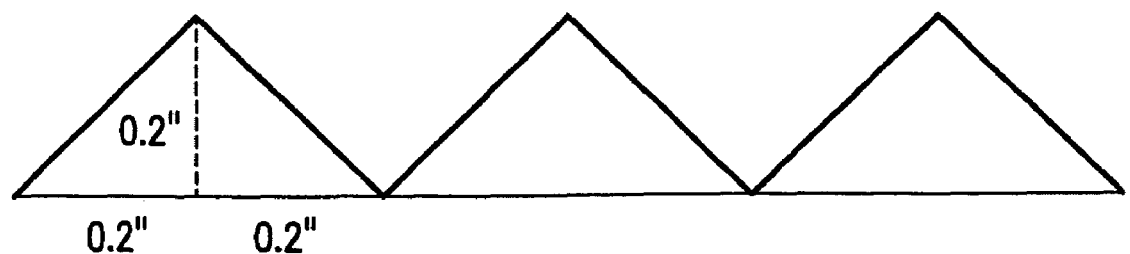

By attenuating the wavelength and creating a given fractional wavelength design, various designs can be achieved. Similar calculations are made for the 2400 MHZ frequency, with the results shown in FIG. 5B. For this frequency, the repeating triangle is approximately 0.2 inches high and 0.4 inches long.

Figure 6:
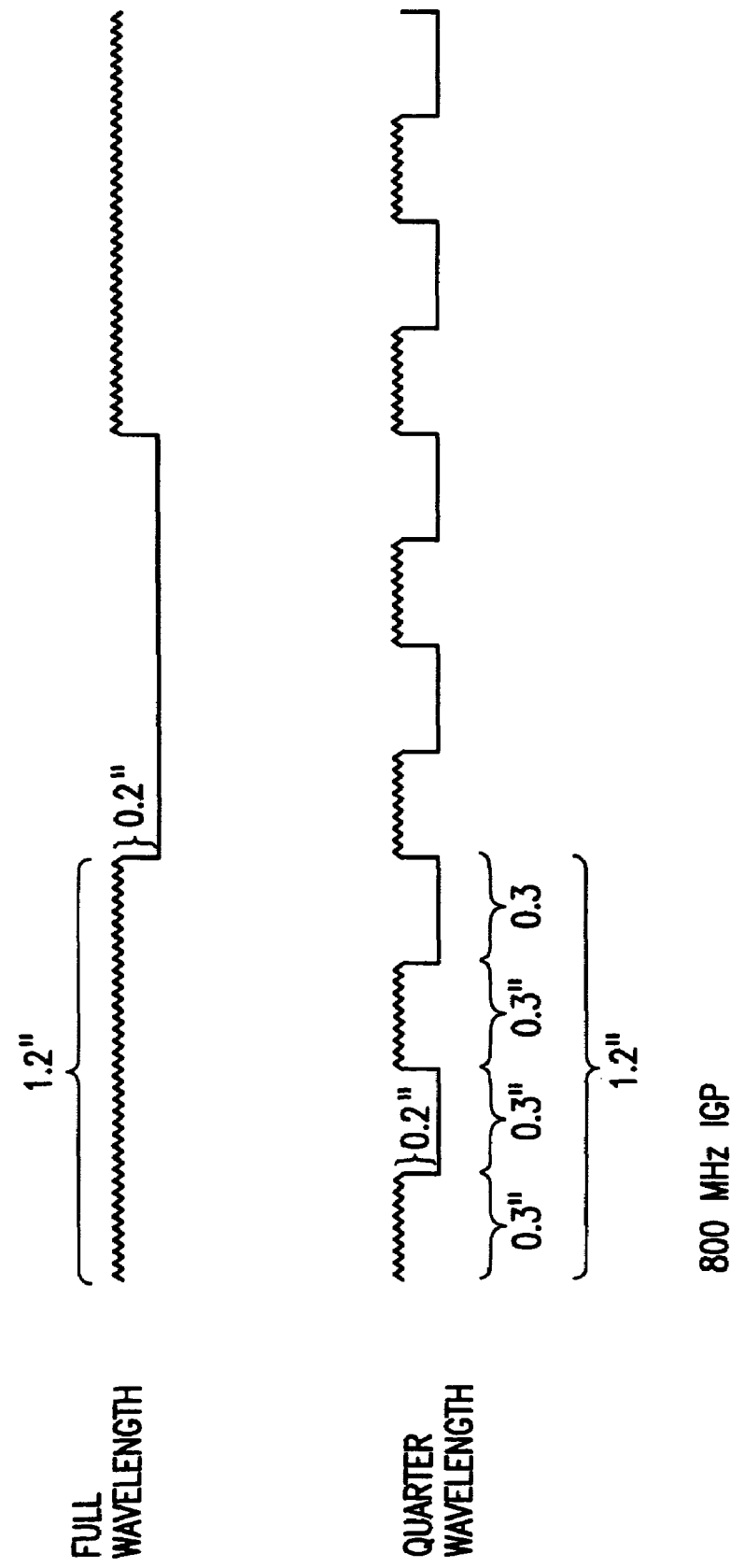
FIGS. 6A and 6B illustrate two superimposed IGPs for two different EM frequencies.

FIG. 6 illustrates how the IGPs need to be overlaid or superimposed to attenuate both the 800 MHZ and 2400 MHZ EM waves. The illustrated patterns would repeat along the entire length of the building material. In addition, the IGP can be provided in multiple layers for applications where greater shielding security or more critical shielding is needed. For certain materials, the IGP can be provided within the thickness of the material, either in layers or in different positions throughout the depth of material to provide greater interference with the signals.

For the case of commercial wireless devices, the grating pattern is designed to repeat every 3.69 inches in order to accommodate the entire 800 MHZ through 2400 MHZ frequency range. The IGP will maximize the interference generated for these selected frequencies. If desired, this technique may be optimized for whatever frequency or range of frequencies is under consideration. Depending on the frequencies selected and the application, the IGP may be built either horizontally or vertically into then building material or upon the structure. In the far field of the EM wave, the IGP will typically appear as a surface roughness feature on whatever substrate is used.

Figure 7:
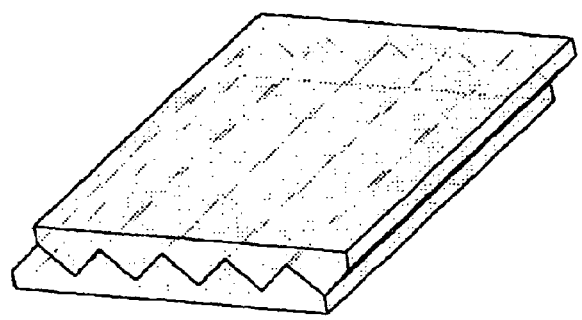
FIG. 7 is a perspective view of two stacked diffraction gratings.

FIG. 7 illustrates how diffraction gratings can be stacked to provide additional and more secure shielding. Two different IGPs facing in opposite directions can be placed one on top of the other with patters intermeshing so that a relatively flat construction is obtained. The stacked grating of FIG. 7 includes two IGPs of similar structure, but the same result can be achieved with different IGPs except that the intermeshing of the patters will not be so complementary. Of course, it is also possible to stack the IGPs one on top of the other oppositely to that shown in FIG. 7 if the greater total thickness resulting from such stacking can be tolerated.

Figure 8:
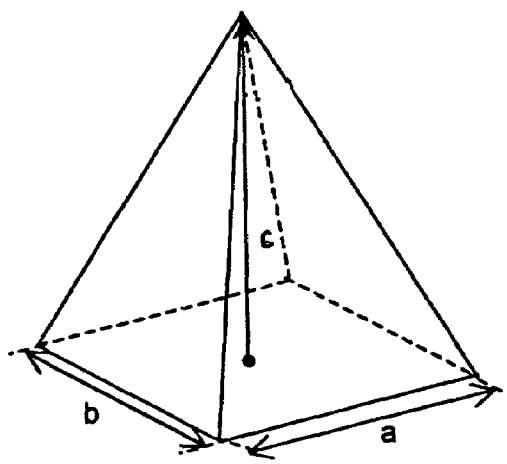
FIG. 8 is a view of a portion of a diffraction grating in the shape of a pyramidal cone.
Figure 9:
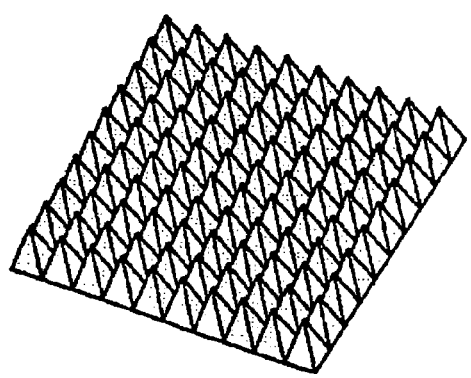
FIG. 9 is a perspective view of a diffraction grating made of a plurality of pyramidal cones according to FIG. 8.

Additional patterns can be used: gratings of cones, spheres and other geometric shapes. These patterns would be sized appropriately for the wavelength under consideration. These patterns can be incorporated into structures that were composed of either vertical or horizontal layers. FIG. 8 illustrates a pyramidal cone which can be created as a 3-dimensional IGP. A plurality of cones can be arranged adjacent each other to form a building panel as shown in FIG. 9. These can be placed along side or within a building material to provide the desired shielding. Also, cone s configured for different wavelengths can be stacked as shown in FIG. 7.

Furthermore the layers within the structure could be offset along their major axis creating a "polarizing" effect. The overall structure, pattern and material of the IGP would depend on the frequency, cost and operating constraints imposed by the overall design.

Figure 11A:
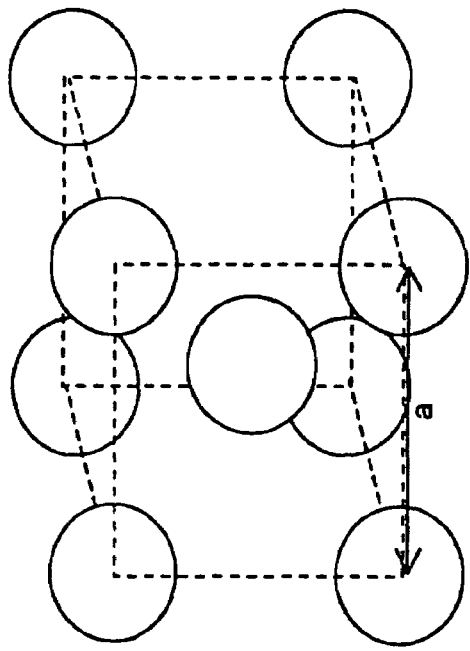
FIGS. 11A and 11B are schematic illustrations of a body centered cubic crystal structure for a diffraction grating made by nanoparticle growth.
Figure 11B:
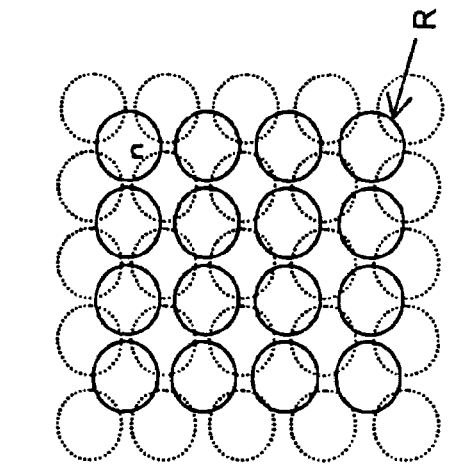
Figure 10A:
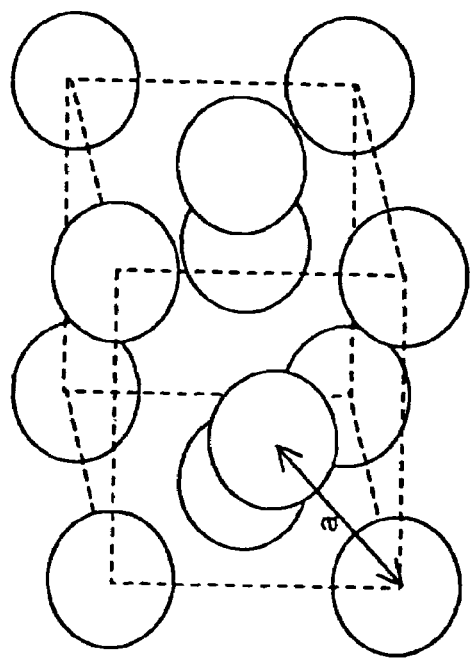
FIGS. 10A and 10B are schematic illustrations of a face centered cubic crystal structure for a diffraction grating made by nanoparticle growth.
Figure 10B:
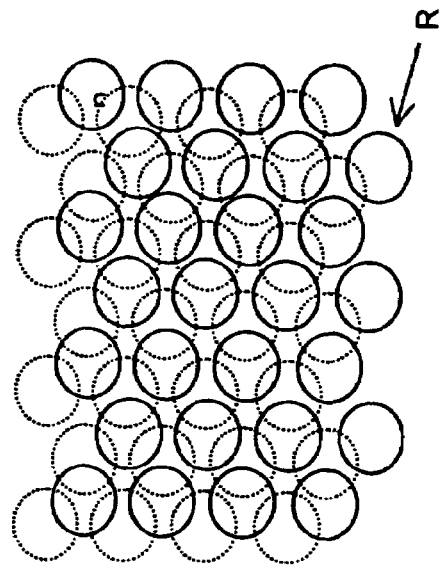

Another way of constructing the IGP is to prepare a thin layer of nanoparticles in a predetermined arrangement so that it can act as an IGP. For examples, nanoparticles can be grown in a face-centered cubic crystal structure as shown in FIGS. 10A and 10B with the crystal structure oriented to provide the desired shielding. Alternatively, nanoparticles can be grown in a body-centered cubic structure as shown in FIGS. 11A and 11B when desired.

In summary, this invention utilizes a combination of:
Selected high dielectric materials
IGP pattern
IGP structure In order to create substantially RF-free environments which may be optimized for specific frequencies. A number of different techniques can be used to apply these materials to the enclosure to create either a fixed, portable or mobile RF-free environment. Consequently, the enclosure may be used in a variety of applications as described below.

1. Paint

The dielectric materials may be blended with commercial grades of paint. The paint application may then be sprayed on wallboard or other construction materials in the appropriate concentrations utilizing spray nozzles to create an IGP embedded within the paint application. The substrate upon which the paint is applied can be configured as the IGP so that a uniform application of paint is applied thereto. Alternatively, to facilitate application of this paint, spray nozzles can be configured to deposit the appropriate interference pattern or IGP for reduction of the particular wavelengths or frequencies under consideration onto a flat substrate. The net effect will be a painted surface that will be identical to a normal surface except that it will be textured with the IGP in order to reduce or eliminate the transmissions of RF signals therethrough.

This application technique can be used for both an already painted surface as well as for a non-painted surface. This application technique may be utilized for the construction of new buildings as well as for existing buildings. Since the material will be blended with both interior and exterior quality paint, the application may be used on either interior or exterior surfaces, or both. To conceal the IGP, it can be provided within a settable building material such as cement or concrete.

In embodiments where the IGP is provided on the exterior or interior surfaces of the construction material, the enclosure can be made of any ordinary construction material, such as wood, cement, brick, cinder block, metal or plastic, fabric, cardboard or the like. The enclosure may be a container or box, or a more substantial construction such as a theater or other building. As RF signals are usually generated from a source such as a tower, when the enclosure is a building, the side walls and the roof or ceiling of the enclosure are typically painted. It is not necessary to paint the floor although this may be advantageous for certain application. When the enclosure is a box or other portable item, all sides as well as the top and bottom are painted. Of course, the coating can be applied to the inside or outside of the enclosure, and it can be covered by other finishing materials, such as siding, wall coverings, etc.

The construction material itself can be provided in the form of the grating with the appropriate patters, and then the dielectric material can be applied to the construction material as a paint or other adherent coating. Any surface finishing that is applied to construction material or support member must not destroy the grating pattern that is to receive the paint or coating so that the attenuation properties of the grating are not damaged.

2. Wallboard or Other Construction Materials

The IGP may be incorporated onto the surface of wallboard or other construction materials such as siding, roofing, paneling the paper, plastic wrapping and the like during the manufacturing process. Again, the materials can be applied by spray nozzles to create the IGP or upon a surface that is already provided with the IGP as a texture thereon. An adhesive may be utilized as the binding component, and the dielectric material applied as a dry powder, which is adhered to substrate by the adhesive.

The construction material can be configured with the desired IGS(s) and then be provided with a uniform application of a paint or coating of the high dielectric material or of an adhesive that can adhere a powder high dielectric material thereon. The manufactured wallboard (or other construction materials) can then be shipped with the IGP embedded on or inside it. In this case, the appropriate handling care must be taken with this wallboard so as to not damage the IGP. The wallboard (or other construction materials) may then be used in the construction process to create the RF-free enclosure.

3. Drapery and Clothing

Since the IGP may be constructed in a flexible format, existing manufacturing processes may be used to essentially "embroider" the IGP into a cloth or fabric used for wall coverings, draperies for windows or even for clothing. It is not anticipated that the IGP-embedded clothing material would be part of an everyday lifestyle, but these clothing materials could be used in high RF-radiation environments where the safety of the wearer is paramount.

Such IGP-embedded wall and window coverings may be used to construct RF-free environments in both new and existing buildings, or to reinforce the RF protection of a building that has been painted with RF shielding materials.

Another embodiment of this would be to apply a plastic or inorganic substrate in the form of the desired grating pattern onto the drapery or clothing. The substrate can be coated or painted with high dielectric material to form the IGP.

4. Window Coverings

IGPs for window applications can also be developed. These applications will utilize materials for support substrates that are transparent or semi-transparent. The IGP's may be created on a plasticized substrate, such as polyacetate, or may be a self-adhesive film. The substrate itself can include the high dielectric material therein or be made from it, or a transparent paint or coating containing the high dielectric material can be applied onto the transparent grating structure of the polymer that is adhered or otherwise provided upon the fabric material.

As such, the IGP can be applied directly to existing windows or may be applied to window as part of the manufacturing process. A semi-transparent, or even opaque, application will have the additional benefit of attenuating visible light as well. This approach is doubly useful in buildings where shade as well as an RF-free environment is desirable.

The coating can be applied directly onto glass or onto a glass or plastic panel that is placed between two sheets of glass. Again, the glass or plastic panel can be provided with a texture of the IGP and then be provided with the applicable coating. Again, an adhesive can be applied to the texture and then dry inorganic material of high dielectric properties can be adhered to the substrate by the adhesive.

What is claimed is:

1. A method of rendering telecommunication devices ineffective, which comprises creating a substantially radio frequency radiation-free environment by providing a non-conductive interference generating pattern (IGP) that is or includes a diffraction grating adjacent the environment in a position between the environment and a source of radio frequency radiation signals so as to substantially reduce, or interfere with such signals by attenuation of signal wavelength thus preventing typical operation of the telecommunications devices, wherein the IGP is provided as a support member configured in the shape of a diffraction grating.

2. The method of claim 1 wherein the support member is coated with one or more dielectric materials to form the diffraction grating.

3. The method of claim 2 wherein the diffraction grating is provided as a paint or coating on the support member and the support member forms the wall(s), ceiling or floor of the enclosure.

4. The method of claim 2 wherein the diffraction grating is provided as a paint or coating on the support member and the support member is applied to the wall(s), ceiling or floor of the enclosure.

5. The method of claim 2 wherein the support member is made of an organic or an inorganic material.

6. The method of claim 2 wherein the dielectric materials include families of materials of high dielectric constant, K, ranging from values of K=6 to K=100.

7. The method of claim 6 wherein the dielectric materials include compounds of silicon and of carbon, refractory materials, rare earth materials, or semiconductor materials.

8. The method of claim 1 wherein the environment is an enclosure having one or more walls and the support member is provided as at least one wall.

9. The method of claim 8 wherein the enclosure also includes a ceiling and floor and the support member is also provided upon at least one of the ceiling or floor.

10. The method of claim 8 wherein the enclosure is a structure that includes one or more windows or doors and the support member is provided adjacent to or upon at least one of the windows or doors.

11. The method of claim 10 wherein the support member is provided upon a cloth, fabric or other shielding material that is located adjacent to the windows or doors of the enclosure.

12. The method of claim 1 wherein the environment is a container that is portable, mobile or stationary and that has a top, bottom and sides each of which is provided with the support member.

13. The method of claim 1 wherein the IGP is configured to attenuate radio frequency radiation in a range of 800 to 38,000 MHZ.

14. The method of claim 1 which further comprises superimposing a plurality of support members to provide IGPs that attenuate the entire range of radio frequency radiation.

15. The method of claim 1 wherein the support member is comprised of different IGPs so as to substantially attenuate the entire range of radio frequency radiation.

16. The method of claim 1 wherein the support member is provided in the form of a grating, cone, sphere or polygon.

17. The method of claim 1 wherein the IGP is comprised of different patterns constructed with different physical dimensions for each pattern.

18. The method of claim 17 wherein the IGP is comprised of vertical layering of the different multiple patterns.

19. The method of claim 17 wherein the IGP is comprised of horizontal layering of the different multiple patterns.

20. The method of claim 17 wherein the IGP is comprised of vertical or horizontal layering of the different multiple patterns which are axially offset from each other.

21. The substantially radio frequency radiation-free environment provided by the method of claim 1.

* * * * *